(12) United States Patent
Dahlheimer

(10) Patent No.: US 7,431,303 B2
(45) Date of Patent: Oct. 7, 2008

(54) HEAT CONDUCTING SEAL

(75) Inventor: John Dahlheimer, Laconia, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/542,565

(22) PCT Filed: Jan. 14, 2004

(86) PCT No.: PCT/US2004/000954

§ 371 (c)(1),
(2), (4) Date: Jul. 18, 2005

(87) PCT Pub. No.: WO2004/068008

PCT Pub. Date: Aug. 12, 2004

(65) Prior Publication Data

US 2006/0120900 A1    Jun. 8, 2006

Related U.S. Application Data

(60) Provisional application No. 60/441,371, filed on Jan. 20, 2003.

(51) Int. Cl.
*F16J 15/34* (2006.01)
*F16J 15/38* (2006.01)

(52) U.S. Cl. ..................... 277/359; 277/391

(58) Field of Classification Search ........... 277/359, 277/360, 380, 377, 384, 385, 391, 930, 392, 277/393

See application file for complete search history.

(56) References Cited

U.S. PATENT DOCUMENTS

| | | | | |
|---|---|---|---|---|
| 2,752,176 | A * | 6/1956 | Ayling | 277/374 |
| 3,601,413 | A * | 8/1971 | Darnell | 277/404 |
| 3,895,811 | A * | 7/1975 | Richard et al. | 277/405 |
| 3,914,072 | A * | 10/1975 | Rowley et al. | 417/423.11 |
| 4,095,807 | A * | 6/1978 | Jandt et al. | 277/374 |
| 4,114,899 | A * | 9/1978 | Kulzer et al. | 277/367 |
| 4,779,876 | A * | 10/1988 | Novosad | 277/397 |
| 5,509,668 | A * | 4/1996 | Kurita et al. | 277/390 |
| 6,113,106 | A * | 9/2000 | Dahlheimer | 277/433 |
| 6,561,515 | B1 * | 5/2003 | Bjornson | 277/358 |
| 6,805,357 | B2 * | 10/2004 | Dahlheimer | 277/377 |
| 6,962,340 | B2 * | 11/2005 | Maruyama | 277/370 |

* cited by examiner

*Primary Examiner*—Patricia Engle
*Assistant Examiner*—Gilbert Y Lee
(74) *Attorney, Agent, or Firm*—Ronald W. Wangerow; Harness, Dickey & Pierce, P.L.C.

(57) ABSTRACT

A mechanical face seal, for sealing about a rotating shaft, includes a seal head assembly in sealing engagement with a seal seat assembly. The seal seat assembly has a washer with a portion that is sandwiched between a grommet and a seal seat. Another portion of the washer is sandwiched between a sleeve or shoulder on the shaft and an impeller. Frictional heat generated by the seal can be conducted away from the seal seat to the sleeve or shoulder on the shaft, which is particularly advantageous when the face seal is operated without water adjacent to the seal seat.

20 Claims, 1 Drawing Sheet

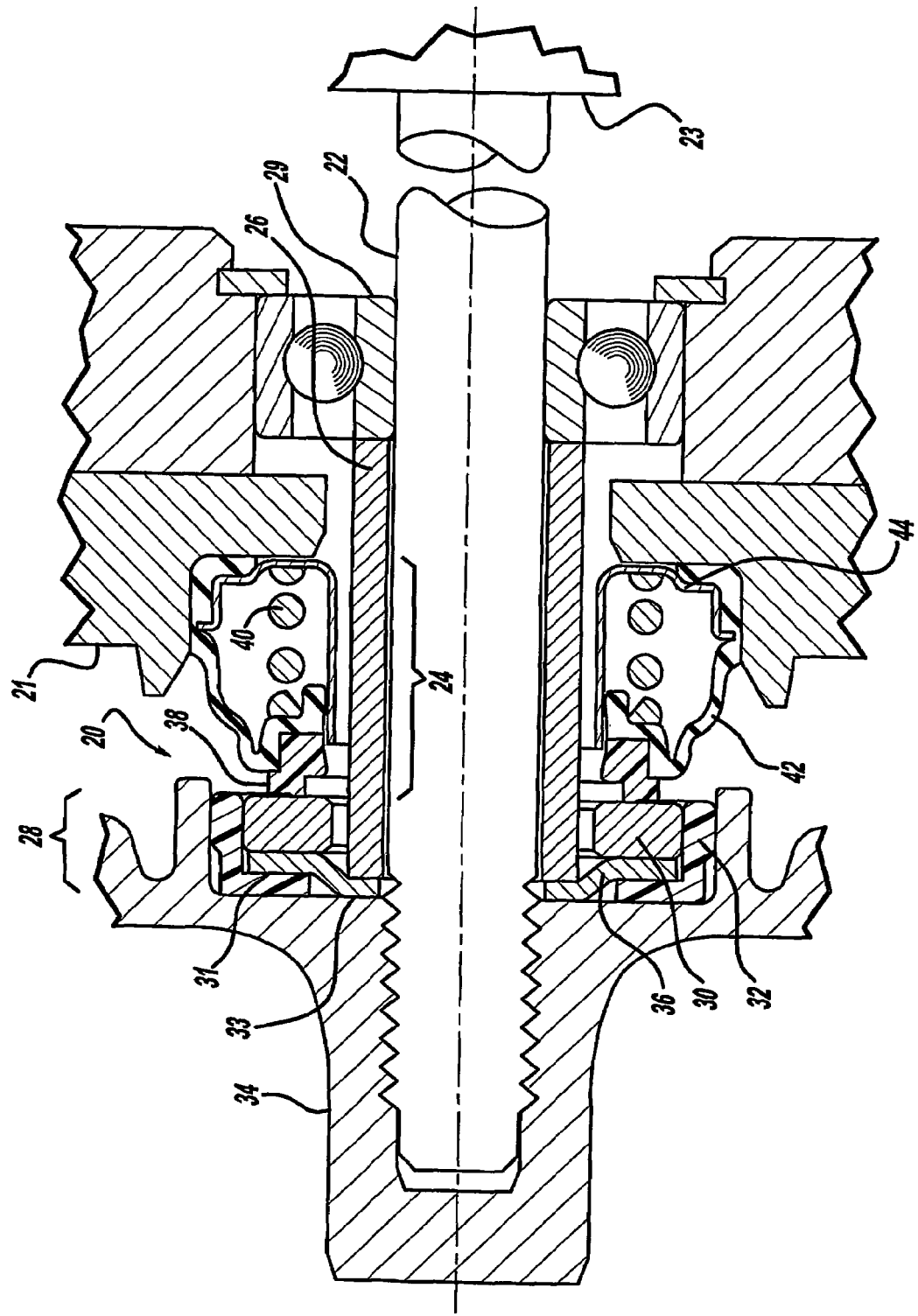

HEAT CONDUCTING SEAL

CROSS-REFERENCE TO RELATED APPLICATIONS

This application claims the benefit of U.S. Provisional Application No. 60/441,371, filed on Jan. 20, 2003. The disclosure of the above application is incorporated herein by reference.

FIELD OF THE INVENTION

The present invention relates in general to shaft seals, and more particularly to mechanical face seals employed with rotating shafts.

BACKGROUND OF THE INVENTION

A mechanical face seal, which may be employed for example in a dishwasher, may include a stationary seal head assembly that mates with and seals against a rotating seal seat assembly. Typically, the seal seat assembly mounts to an impeller that is driven, via a shaft, by a pump. It is common for the impeller to be made of a plastic material. Such a conventional face seal assembly performs very well at sealing out water, and prevents the impeller from overheating because the water adjacent to the seal absorbs frictional heat generated by the seal. A concern arises, however, with these conventional face seals, when the pump is run dry—that is, the pump is run, but a water supply valve is closed, thus preventing water from flowing adjacent to the face seal for cooling the seal. This situation can happen, for example, in a dishwasher, when a dishwasher is installed, but the water supply valve is not opened. If the dishwasher is then run, there is no water adjacent the seal to carry away the frictional heat generated by the seal operation. The frictional heat then builds up, and some of the heat will transfer into the impeller, which also will have no water surrounding it to carry away heat. After operating in this way for a relatively short time, the heat in the impeller can build up to the point where it will partially melt and possibly decouple from an impeller hub. This can destroy the impeller pumping ability and possibly create a water leak path.

Thus, it is desirable to have a face seal for a rotating shaft that will adequately seal water, and can also significantly reduce the chance of heat build up damaging a mating component, such as an impeller, even if the face seal is run in a dry environment.

SUMMARY OF THE INVENTION

In its embodiments, the present invention contemplates a heat conducting seal seat assembly The seal seat assembly includes a seal seat adapted to be in surface contact with a seal head assembly, a grommet, and a heat conducting washer having a first portion located between the seal seat and the grommet, and a second portion abutting a heat sink.

An advantage of the present invention is that a seal seat assembly can dissipate frictional heat generated during dry pump operation, thus significantly reducing the chance of impeller and/or pump failure. In a dishwashing machine, for example, if the dishwasher is run without the water supply valve open, then one will have dry pump operation. The seal seat assembly dissipates extra generated heat, thus significantly reducing the chances of seal damage that can lead to pump failure and later water leakage.

Another advantage of the present invention is that a washer mounted adjacent a motor shaft sleeve or shoulder will allow the impeller to be augered onto the shaft while preventing it from being augered on too far. This significantly reduces the chances of a seal failure due to augering of the impeller too far onto the shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

The drawing is a cross-sectional view of a seal assembly in accordance with the principles of the present invention.

DETAILED DESCRIPTION OF THE PREFERRED EMBODIMENTS

The following description of the preferred embodiment(s) is merely exemplary in nature and is in no way intended to limit the invention, its application, or uses.

The drawing illustrates a mechanical face seal assembly 20 mounted about a rotatable shaft 22. The rotatable shaft 22 may be driven by, for example, a pump motor 23 in an automatic dishwasher—although, the seal assembly 20 may be employed in other types of sealing applications for a rotatable shaft 22. The shaft 22 includes a shaft sleeve 26 mounted thereon. As an alternative to a shaft sleeve, the shaft 22 may have a shoulder formed thereon.

The seal assembly 20 includes a seal head assembly 24, mounted stationary relative to a pump housing 21, and a heat conducting seal seat assembly 28, rotationally fixed to the shaft 22. A bearing 29 mounts on the shaft 22, with an inner race thereof abutting the shaft sleeve 26.

The heat conducting seal seat assembly 28 includes a seal seat 30, which abuts against the seal head assembly 24, a grommet 32, which abuts an impeller 34, and a washer 36, having a first portion 31 captured between the grommet 32 and the seal seat 30. A second portion 33 of the washer 36 is also clamped between the impeller 34 and the shaft sleeve 26. The impeller 34 is preferably threaded onto the motor shaft 22, which clamps the washer 36 against the sleeve 26. The washer 36 is preferably made of metal, such as aluminum, the cup shaped grommet 32 is preferably made of an elastomeric material such as rubber, and the impeller 34 is preferably made of an elastomer and/or plastic. The seal seat 30 is preferably made of stainless steel, although other suitable face seal material, such as for example ceramic, may be employed if so desired. A face seal component 38 of the seal head assembly 24 is biased against the seal seat 30 via a spring 40. The seal head assembly 24 includes an elastomeric seal member 42 supported by a retainer member 44.

In operation, if the pump motor 23 is operated while the water supply valve for the dishwasher is closed, then the seal seat assembly 28 will help by conducting away heat. Specifically, the washer 36 conducts frictional heat from the seal seat 30 to the shaft sleeve 26, which serves as a heat sink. This provides a direct heat path between the seal seat 30 and the sleeve 26. Moreover, the grommet 32, by encapsulating the outside of the seal seat 30 and the washer 36, insulates the heat from the impeller 34. This significantly reduces the chances that enough heat will reach the impeller 34 to cause any damage. If the water supply valve for the dishwasher is open, then the water itself will absorb much of the heat generated at the seal. So again, the impeller 34 is protected from overheating.

While certain embodiments of the present invention have been described in detail, those familiar with the art to which this invention relates will recognize various alternative designs and embodiments for practicing the invention as defined by the following claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A face seal assembly for a rotatable shaft, the face seal assembly comprising:
    a seal head assembly adapted to be rotationally fixed relative to a housing, said seal head assembly including a face seal component attached to an elastomeric seal member and further including a spring biasing said face seal component in an axial direction;
    a seal seat assembly mounted to said rotatable shaft and including a seal seat in contact with the seal head assembly and a heat conducting washer having a first generally flat surface portion disposed between and against an axial end face of said seal seat and a grommet, and said heat conducting washer having a second generally flat surface portion disposed against heat sink means disposed on said shaft for conducting heat away from said seal seat,
    wherein said axial end face has a radially extending generally flat portion circumscribing said shaft and said first portion of said heat conducting washer is in heat conducting contact with a majority of said seal seat.

2. The face seal assembly of claim 1 wherein said grommet surrounds said first generally flat surface portion of said heat conducting washer and said seal seat.

3. The face seal assembly of claim 1 wherein said heat sink means includes a sleeve disposed on said shaft.

4. The face seal assembly of claim 1 wherein said heat conducting washer is made of metal.

5. The face seal assembly of claim 1, wherein said first and second portions of said heat conducting washer are radially spaced apart.

6. The face seal assembly of claim 5, wherein said first and second portions of said heat conducting washer are radially spaced apart such that said first and second portions do not overlap one another.

7. The face seal assembly of claim 5, wherein said first portion is spaced radially outwardly from said second portion.

8. A heat conducting seal seat assembly for a rotatable shaft comprising:
    a seal seat adapted to be in surface contact with a seal head assembly;
    a grommet surrounding said seal seat; and
    a heat conducting washer having a first portion clamped between the seal seat and the grommet and in direct contact with the seal seat and grommet, and a second portion axially abutting heat sink means disposed on the shaft for conducting heat away from said seal seat.

9. The heat conducting seal seat assembly of claim 8 wherein said seal seat is made of stainless steel.

10. The heat conducting seal seat assembly of claim 8 wherein said grommet is made of an elastomeric material.

11. The heat conducting seal seat assembly of claim 8 wherein said washer is made of metal.

12. The heat conducting seal seat assembly of claim 8 wherein said heat sink means is a sleeve adapted to mount about said shaft.

13. The heat conducting seal seat assembly of claim 8, wherein said first portion of said washer has opposite substantially flat radially extending surfaces, said seal seat has a substantially flat radially extending surface in direct contact with one of said substantially flat radially extending surfaces of said first portion, and said grommet has a substantially flat radially extending surface in direct contact with the other one of said substantially flat radially extending surfaces of said washer.

14. The heat conducting seal seat assembly of claim 8, wherein said first portion of said heat conducting washer is axially offset from said second portion of said heat conducting washer.

15. A sealing system comprising:
    a housing;
    a motor mounted to said housing;
    a shaft driven by said motor and rotatably supported by said housing;
    an impeller mounted to said shaft;
    a seal head assembly fixed relative to said housing and surrounding said shaft, said seal head assembly including a face seal component attached to an elastomeric seal member and further including a spring biasing said face seal component in an axial direction; and
    a seal seat assembly mounted to said rotatable shaft and including a seal seat in contact with said seal head assembly and a heat conducting washer with a first generally flat portion clamped axially between a grommet, said seal seat and said impeller, said first portion directly engaging said seal seat, and a second generally flat portion clamped axially between said impeller and a heat sink means disposed on said shaft for conducting heat away from said seal seat,
    wherein said seal seat is substantially axially stationary relative to said shaft and said face seal component can move axially relative to said shaft.

16. The sealing system of claim 15 wherein said grommet surrounds a portion of said heat conducting washer and said seal seat.

17. The sealing system of claim 15 wherein said heat sink means includes a sleeve disposed on said shaft.

18. The sealing system of claim 15 wherein said heat conducting washer is made of metal.

19. The sealing system of claim 15, wherein said first generally flat portion of said heat conducting washer circumscribes said shaft.

20. The sealing system of claim 15, wherein said seal seat has a radially extending generally flat surface that circumscribes said shaft and said first generally flat portion of said heat conducting washer is in heat conducting contact with a majority of said radially extending generally flat surface of said seal seat.

* * * * *